United States Patent

Rozak et al.

[11] Patent Number: 5,884,258
[45] Date of Patent: *Mar. 16, 1999

[54] METHOD AND SYSTEM FOR EDITING PHRASES DURING CONTINUOUS SPEECH RECOGNITION

[75] Inventors: Michael J. Rozak, Issaquah; Fileno A Alleva, Redmond, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 741,691

[22] Filed: Oct. 31, 1996

[51] Int. Cl.⁶ .................. G10L 5/06; G10L 9/00
[52] U.S. Cl. .......... 704/251; 704/244; 704/245; 704/231
[58] Field of Search .................. 704/251, 244, 704/246, 245, 231, 233, 234

[56] References Cited

U.S. PATENT DOCUMENTS

| | | | |
|---|---|---|---|
| 4,566,065 | 1/1986 | Toth | 704/251 |
| 4,618,984 | 10/1986 | Das et al. | 704/244 |
| 4,761,815 | 8/1988 | Hitchcock | 704/253 |
| 4,783,803 | 11/1988 | Baker et al. | 704/252 |
| 4,799,262 | 1/1989 | Feldmen et al. | 704/241 |
| 4,809,333 | 2/1989 | Taylor | 704/252 |
| 4,829,576 | 5/1989 | Poter | 704/235 |
| 4,837,831 | 6/1989 | Gillick et al. | 704/245 |
| 4,870,686 | 9/1989 | Gerson et al. | 704/234 |
| 4,882,757 | 11/1989 | Fisher et al. | 704/253 |
| 4,914,704 | 4/1990 | Cole et al. | 704/235 |
| 4,972,485 | 11/1990 | Dautrich et al. | 704/251 |
| 5,027,406 | 6/1991 | Roberts et al. | 704/244 |
| 5,040,127 | 8/1991 | Gerson | 704/255 |
| 5,091,947 | 2/1992 | Ariyoshi et al. | 704/246 |
| 5,127,055 | 6/1992 | Larkey | 704/244 |
| 5,231,670 | 7/1993 | Goldhor et al. | 704/275 |
| 5,248,707 | 9/1993 | Gould et al. | 704/231 |
| 5,367,453 | 11/1994 | Capps et al. | 395/793 |
| 5,386,494 | 1/1995 | White | 704/275 |
| 5,425,128 | 6/1995 | Morrison | 704/243 |
| 5,526,463 | 6/1996 | Gillick et al. | 704/251 |
| 5,548,681 | 8/1996 | Gleaves et al. | 704/233 |
| 5,561,757 | 10/1996 | Southgate | 395/157 |
| 5,604,897 | 2/1997 | Travis | 395/795 |
| 5,623,578 | 4/1997 | Mikkilineni | 704/255 |
| 5,640,485 | 6/1997 | Ranta | 704/251 |
| 5,651,096 | 7/1997 | Pallakoff et al. | 704/275 |
| 5,712,957 | 1/1998 | Waibel et al. | 395/2.49 |

*Primary Examiner*—David R. Hudspeth
*Assistant Examiner*—Robert Louis Sax
*Attorney, Agent, or Firm*—Seed & Berry LLP

[57] ABSTRACT

A method and system for editing words that have been misrecognized. The system allows a speaker to specify a number of alternative words to be displayed in a correction window by resizing the correction window. The system also displays the words in the correction window in alphabetical order. A preferred system eliminates the possibility, when a misrecognized word is respoken, that the respoken utterance will be again recognized as the same misrecognized word. The system, when operating with a word processor, allows the speaker to specify the amount of speech that is buffered before transferring to the word processor.

10 Claims, 13 Drawing Sheets

| Before | Event | After |
|---|---|---|
| 301 — This is sample test\| | backspace | This is sample test\| |
| 302 — This is sample\|test\| | left arrow | This is sample\|test\| |
| 303 — This is sample test | click | This is sample\|test\| |
| 304 — This is sample text | click | This is sample\|text |

*Fig. 3A*

| Before | Event | After |
|---|---|---|
| This is phrase 1    This is phrase 2\| | backspace | This is phrase 1\| |
| This is phrase 1    This is phrase 2\| | left arrow | This is phrase 1\| |
| This is phrase 1    This is phrase 2 | click | This is phrase 1 |
| This is phrase 1    This is phrase 2 | click | This is phrase 1\| |
| This is phrase 1    This is phrase 2 | click | This is phrase 1\| |

*Fig. 3B*

METHOD AND SYSTEM FOR EDITING PHRASES DURING CONTINUOUS SPEECH RECOGNITION

TECHNICAL FIELD

The present invention relates to computer speech recognition, and more particularly, to the editing of dictation produced by a speech recognition system.

BACKGROUND OF THE INVENTION

A computer speech dictation system that would allow a speaker to efficiently dictate and would allow the dictation to be automatically recognized has been a long-sought goal by developers of computer speech systems. The benefits that would result from such a computer speech recognition (CSR) system are substantial. For example, rather than typing a document into a computer system, a person could simply speak the words of the document, and the CSR system would recognize the words and store the letters of each word as if the words had been typed. Since people generally can speak faster than type, efficiency would be improved. Also, people would no longer need to learn how to type. Computers could also be used in many applications where their use is currently impracticable because a person's hands are occupied with tasks other than typing.

Typical CSR systems have a recognition component and a dictation editing component. The recognition component controls the receiving of the series of utterances from a speaker, recognizing each utterance, and sending a recognized word for each utterance to the dictation editing component. The dictation editing component displays the recognized words and allows a user to correct words that were misrecognized. For example, the dictation editing component would allow a user to replace a word that was misrecognized by either speaking the word again or typing the correct word.

The recognition component typically contains a model of an utterance for each word in its vocabulary. When the recognition component receives a spoken utterance, the recognition component compares that spoken utterance to the modeled utterance of each word in its vocabulary in an attempt to find the modeled utterance that most closely matches the spoken utterance. Typical recognition components calculate a probability that each modeled utterance matches the spoken utterance. Such recognition components send to the dictation editing component a list of the words with the highest probabilities of matching the spoken utterance, referred to as the recognized word list.

The dictation editing component generally selects the word from the recognized word list with the highest probability as the recognized word corresponding to the spoken utterance. The dictation editing component then displays that word. If, however, the displayed word is a misrecognition of the spoken utterance, then the dictation editing component allows the speaker to correct the misrecognized word. When the speaker indicates to correct the misrecognized word, the dictation editing component displays a correction window that contains the words in the recognized word list. In the event that one of the words in the list is the correct word, the speaker can just click on that word to effect the correction. If, however, the correct word is not in the list, the speaker would either speak or type the correct word.

Some CSR systems serve as a dictation facility for word processors. Such a CSR system controls the receiving and recognizing of a spoken utterance and then sends each character corresponding to the recognized word to the word processor. Such configurations have a disadvantage in that when a speaker attempts to correct a word that was previously spoken, the word processor does not have access to the recognized word list and thus cannot display those words to facilitate correction.

SUMMARY OF THE INVENTION

The present invention provides a new and improved computer speech recognition (CSR) system with a recognition component and a dictation editing component. The dictation editing component allows for rapid correction of misrecognized words. The dictation editing component allows a speaker to select the number of alternative words to be displayed in a correction window by resizing the correction window. The dictation editing component displays the words in the correction window in alphabetical order to facilitate locating the correct word. In another aspect of the present invention, the CSR system eliminates the possibility, when a misrecognized word or phrase is respoken, that the respoken utterance will be again recognized as the same misrecognized word or phrase based on analysis of both the previously spoken utterance and the newly spoken utterance. The dictation editing component also allows a speaker to specify the amount of speech that is buffered in a dictation editing component before transferring the recognized words to a word processor. The dictation editing component also uses a word correction metaphor or a phrase correction metaphor which changes editing actions which are normally character-based to be either word-based or phrase-based.

BRIEF DESCRIPTION OF THE DRAWINGS

FIGS. 3A–B illustrate the word/phrase correction metaphor for the dictation editing component.

DETAILED DESCRIPTION OF THE INVENTION

The present invention provides for a dictation editing component that allows the editing of dictation produced by a computer speech recognition (CSR) system. In an exemplary embodiment, the dictation editing component allows a speaker to select the number of alternative words to be displayed in a correction window by resizing the correction window. The dictation editing component also displays the words in the correction window in alphabetical order. A preferred dictation editing component also eliminates the possibility, when a misrecognized word is respoken, that the respoken utterance will be again recognized as the same misrecognized word. The dictation editing component, when providing recognized words to an application program, such as a word processor, preferably allows the speaker to specify the amount of speech that is buffered by the dictation editing component before transferring recognized words to the application program. In the following, the various aspects of the present invention are described when used in conjunction with a discrete CSR system (i.e., the speaker pauses between each word). These aspects, however, can also be used in conjunction with a continuous CSR system. For example, the correction window can be resized to indicate the number of alternative phrases to be displayed. Also, when a speaker selects a phrase to be replaced, the user interface system can ensure that the same phrase is not recognized again.

Figure 1A:
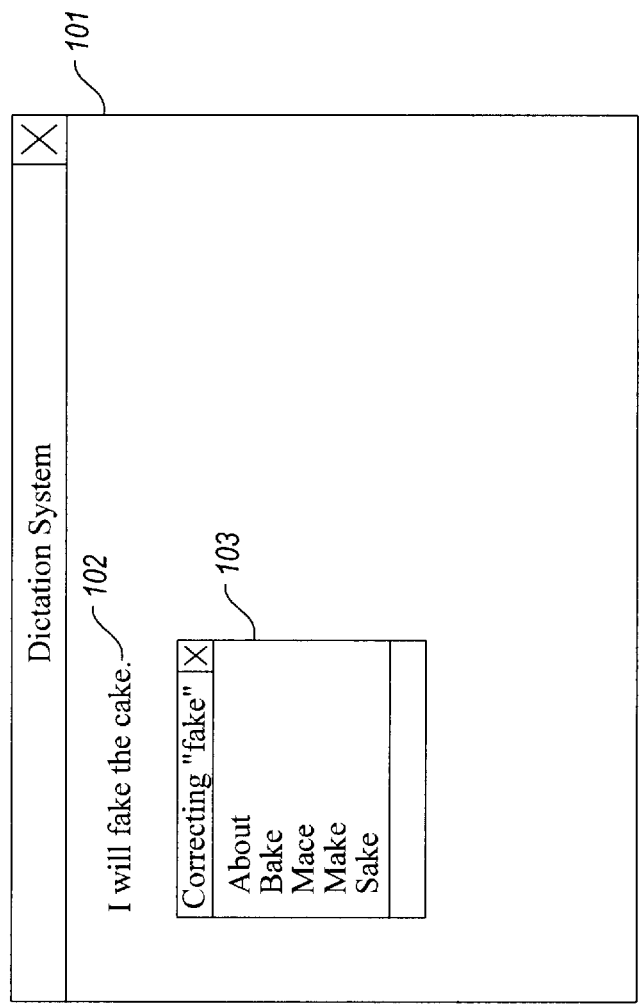
FIG. 1A illustrates a sample resizable correction window.
Figure 1B:
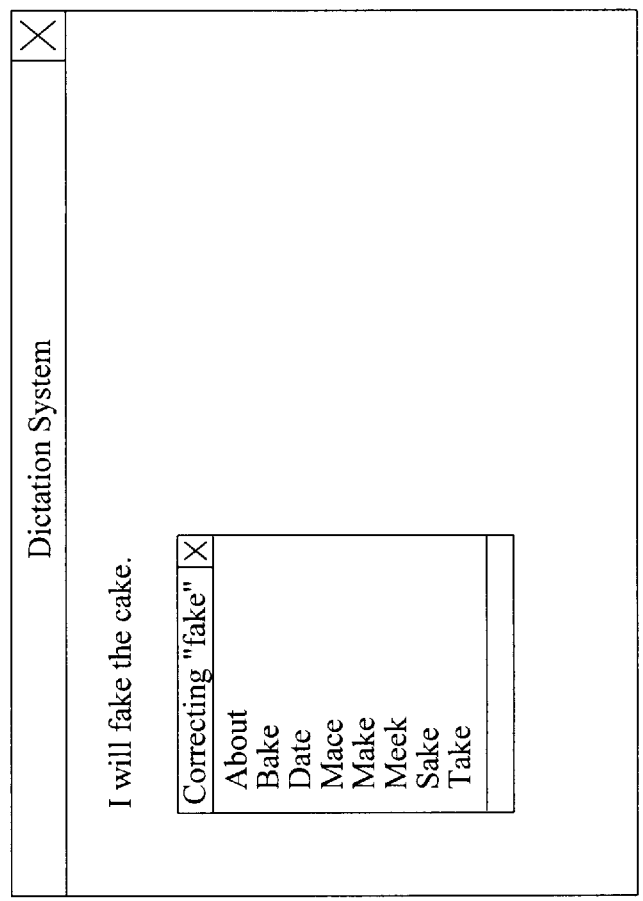
FIG. 1B illustrates the sample correction window after resizing.

FIG. 1A illustrates a sample resizable correction window. The dictation editing component window 101 contains the recognized words 102 and the correction window 103. In this example, the speaker spoke the words "I will make the cake." The recognition component misrecognized the word "make" as the word "fake." The speaker then indicated that the word "fake" should be corrected. Before displaying the correction window, the dictation editing component determines the current size of the resizable correction window and calculates the number of words that could be displayed in that correction window. The dictation editing component then selects that number of words from the recognized word list with the highest probabilities (i.e., alternative words) and displays those words in the correction window using standard window resizing techniques (e.g., pointing to a border of the window with a mouse pointer and dragging the mouse). If the speaker wishes to see more words from the list, the speaker simply resizes the correction window. When the correction window is resized, the dictation editing component again determines the number of words that can be displayed in the correction window and displays that number of words in the correction window. The next time that the speaker indicates to correct a word, the dictation editing component displays the correction window with a number of words that will fit based on its last resizing. In this way, the speaker can effectively select the number of words to be displayed by simply resizing the correction window. FIG. 1B illustrates the sample correction window after resizing.

Additionally, the dictation editing component preferably displays the words in the correction window in alphabetical order. The displaying of the words in alphabetical order allows the speaker to quickly locate the correct word if it is displayed. Prior dictation editing components would display words in correction windows in an order based on the probability as determined by the recognition component. However, when displayed in probability order, it may be difficult for a speaker to locate the correct word unless the correct word is displayed first or second.

Figure 2A:
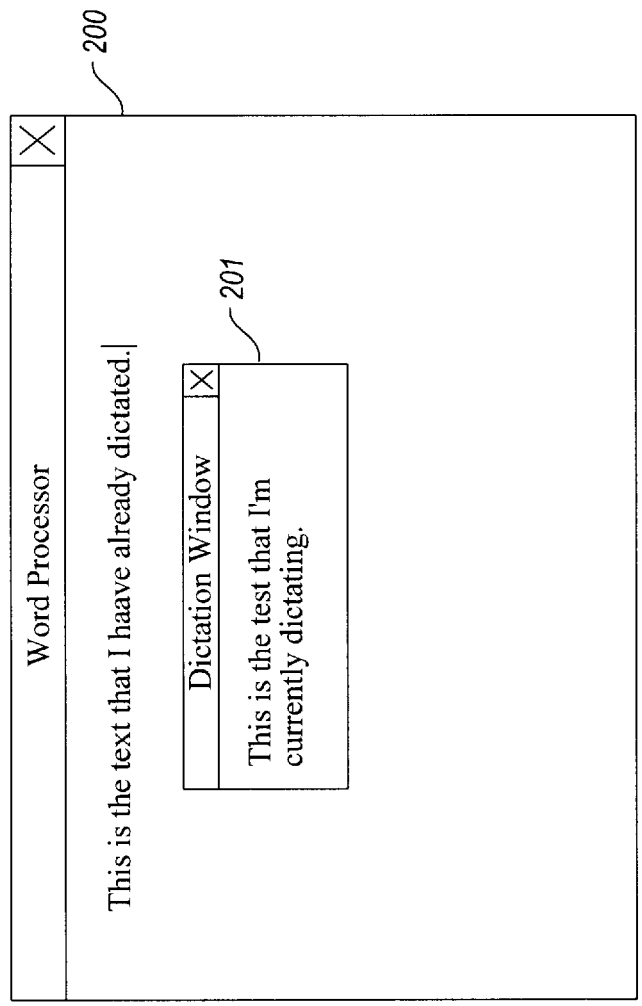
FIG. 2A illustrates an adjustable dictation window.
Figure 2B:
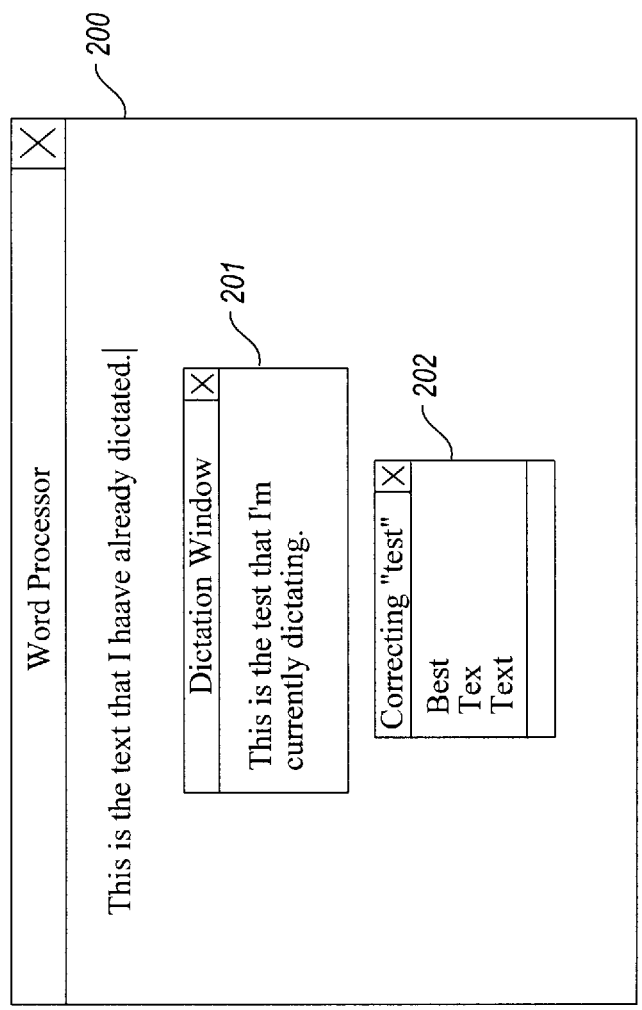
FIG. 2B illustrates the use of a correction window to correct text in the dictation window.

FIG. 2A illustrates an adjustable dictation window for a CSR system that interfaces with a word processor. The CSR system inputs a series of utterances from the speaker, recognizes the utterance, and displays recognized words for the utterances in the dictation window 201. Since the dictation window is controlled by the dictation editing component, the speaker can correct the words in the dictation window. Thus, when a speaker selects to correct a word within the dictation window, the speaker can use any of the correction facilities supported by the dictation editing component. For example, the speaker can use the correction window to display the words in the recognized word list for any word currently displayed in the dictation window. FIG. 2B illustrates the use of a correction window to correct text in the dictation window.

In one embodiment, the dictation editing component allows a speaker to adjust the amount of speech that the dictation window can accommodate. Since the speaker can only use the correction facilities on words within the dictation window, but not on words within the word processor window, the speaker can adjust the size of the dictation window to accommodate the amount of speech based on the dictation habits of the speaker. For example, the speaker can specify that the dictation window should only accommodate one sentence, one paragraph, or a fixed number of words. Alternatively, the speaker can resize the dictation window using standard window resizing techniques to indicate that the dictation window should accommodate as many words as can fit into the window. When the dictation window becomes full, the CSR system transmits either all of the words or some of the words in the dictation window to the word processor. For example, if the speaker indicates that the dictation window should accommodate a sentence, then any time a new sentence is started, the CSR system would transmit all of the words (i.e., one sentence) to the word processor. Conversely, if the speaker resized the dictation window, then the CSR system may transmit only a line of words at a time to the word processor.

FIG. 3A illustrates the word correction metaphor for the dictation editing component. When a word processing system is in dictation mode, the dictation editing component automatically changes the definition of various editing events (e.g., keyboard events, mouse events, pen events, and speech events) to be word-based, rather than character-based. For example, when in dictation mode, the backspace key, which normally backspaces one character, is modified to backspace a word at a time. Thus, when the user depresses the backspace key when in dictation mode, the entire word to the left of the current insertion point is deleted. Similarly, when in dictation mode, the right and left arrow keys will cause the insertion point to move left or right one word, and the delete key will delete the entire word to the right of the insertion point. Also, when a user clicks with a button of the mouse and the mouse pointer is over a word, the dictation editing component selects the word at which the mouse pointer is over, rather than simply setting the insertion point to within the word. However, if the mouse pointer is in between words, then an insertion point is simply set in between the words. Lines 301–304 illustrate sample effects of the word correction metaphor. Each line shows the before and after text when the indicated event occurs. For example, line 302 shows that if the insertion point is after the word "test," then the left arrow event will cause the insertion point to be moved before the word "test." The use of the word correction metaphor facilitates the correction of words when in dictation mode because typically speakers wish to re-speak the entire word when correcting. Thus, when a speaker clicks on a word, the entire word is selected and the speaker can simply speak to replace the selected word. When the speech recognition is continuous, a phrase correction metaphor may be preferable. Because continuous speech recognition may not correctly identify word boundaries, the word correction metaphor may select a misrecognized word whose utterance represents only a part of a word or represents multiple words. It may be preferable in such situations to simply re-speak the entire phrase. Consequently, the definition of various editing events would be changed to be phrase-based, rather than being changed word-based. For example, the editing event of the user speaking the word "backspace" that would normally backspace over the previous character would be changed to backspace a phrase at a time. FIG. 3B illustrates this phrase correction metaphor.

In one embodiment, the CSR system provides misrecognized word elimination to prevent re-recognition of a respoken utterance as the same word that is being corrected. The dictation editing component determines when a speaker is correcting a misrecognized word. The speaker can correct a misrecognized word in different ways. For example, the speaker could delete the word and then speak with the insertion point at the location where the word was deleted. Alternatively, the speaker could highlight the misrecognized word and then speak to replace that highlighted word. When the recognition component receives a respoken utterance, it recognizes the utterance and sends a new recognized word list to the dictation editing component. The dictation editing component then selects and displays the word from the new recognized word list with the highest probability that is other than the word being corrected. In one embodiment, the dictation editing component uses the previous recognized word list for the misrecognized utterance and the new recognized word list to select a word (other than the word being corrected) that has the highest probability of matching both utterances. To calculate the highest probability, the dictation editing component identifies the words that are in both recognized word lists and multiplies their probabilities. For example the following table illustrates sample recognized word lists and the corresponding probabilities.

| Previous Recognized Word List | | New Recognized Word List | |
|---|---|---|---|
| Fake | .4 | Fake | .4 |
| Make | .3 | Mace | .3 |
| Bake | .1 | Make | .2 |
| Mace | .1 | Bake | .1 |

If the speaker spoke the word "make," then without misrecognized word elimination the dictation editing component would select the word "fake" both times since it has the highest probability in both lists. With misrecognized word elimination, the dictation editing component selects the word "mace" when the word "fake" is corrected since the word "mace" has the highest probability other than the word "fake" in the current list. However, when the probabilities from both recognized word lists are combined, the dictation editing component selects the word "make" as the correct word since it has the highest combined probability. The combined probability for the word "make" is 0.06 (0.3×0.2), for the word "mace" is 0.03 (0.1×0.3), and for the word "bake" is 0.01 (0.1×0.1).

The CSR system also automatically adds words to its vocabulary and automatically trains. When a user corrects a misrecognized word by typing the correct word, the dictation editing component determines whether that typed word is in the vocabulary. If the typed word is not in the vocabulary, then the dictation editing component directs the recognition component to add it to the vocabulary using the spoken utterance that was misrecognized to train a model for that word. If, however, the typed word is in the vocabulary, the dictation editing component then automatically directs the recognition component to train the typed word with the spoken utterance that was misrecognized.

The dictation editing component allows for phrase correction, in addition to word correction, when used with a continuous dictation system. In a continuous dictation system, the recognition component may incorrectly identify a word boundary. For example, a speaker may say the phrase "I want to recognize speech." The recognition component may recognize the spoken phrase as "I want to wreck a nice beach." However, the use of single word correction does not provide a very speaker-friendly way to correct such a misrecognition. If the speaker wants to see the alternative words for the word "beach," the words "peach," "teach," and maybe "speech" may be displayed in the correction window. If the speaker wants to see alternative words for the word "nice," the words "ice" and "rice" may be displayed and for the word "wreck," the words "heck" and "rack." Such single word correction will not identify the words "recognize speech."

The dictation editing component allows for correction of phrases so that misrecognitions resulting from incorrect word boundaries can be efficiently corrected. When a speaker selects a phrase for correction, the dictation editing component selects and displays a list of alternative phrases. For example, if the speaker selects "wreck a nice beach," the alternative phrases may be "wreck a nice peach," "rack an ice leach," and "recognize speech." Also, if the speaker selects "wreck a nice," the alternative phrases may be "rack on ice" and "recognize."

Furthermore, when a user selects a misrecognized phrase for correction, the dictation editing component assumes that the current phrase differs from the misrecognized phrase by more than one word. If only one word was incorrect in the misrecognized phrase, then the speaker would simply select that misrecognized word and not the entire misrecognized phrase. Using this assumption, the dictation editing component does not display any alternative phrases that differ from the misrecognized phrase by only one word. Continuing with the previous example, if the speaker selects "wreck a nice beach," then only the alternative phrase "rack an ice leach" and "recognize speech" would be displayed. Since the alternative phrase "wreck a nice peach" differs by only one word, it is not displayed. Additionally, in one embodiment, the dictation editing component makes the assumption that when a speaker selects a phrase for correction, that the misrecognition was the result of an incorrectly identified word boundary. In particular, if the phrase could be corrected by selecting a displayed alternative word, then the speaker would have selected those alternative words. Consequently, the dictation editing component would not display any alternative phrase that could be corrected by correcting individual words from the alternative list. For example, the dictation editing component would not display the phrase "rack an ice leach" if the words "rack," "an," "ice," and "leach" were alternative words for the corresponding misrecognized words.

Figure 4A:
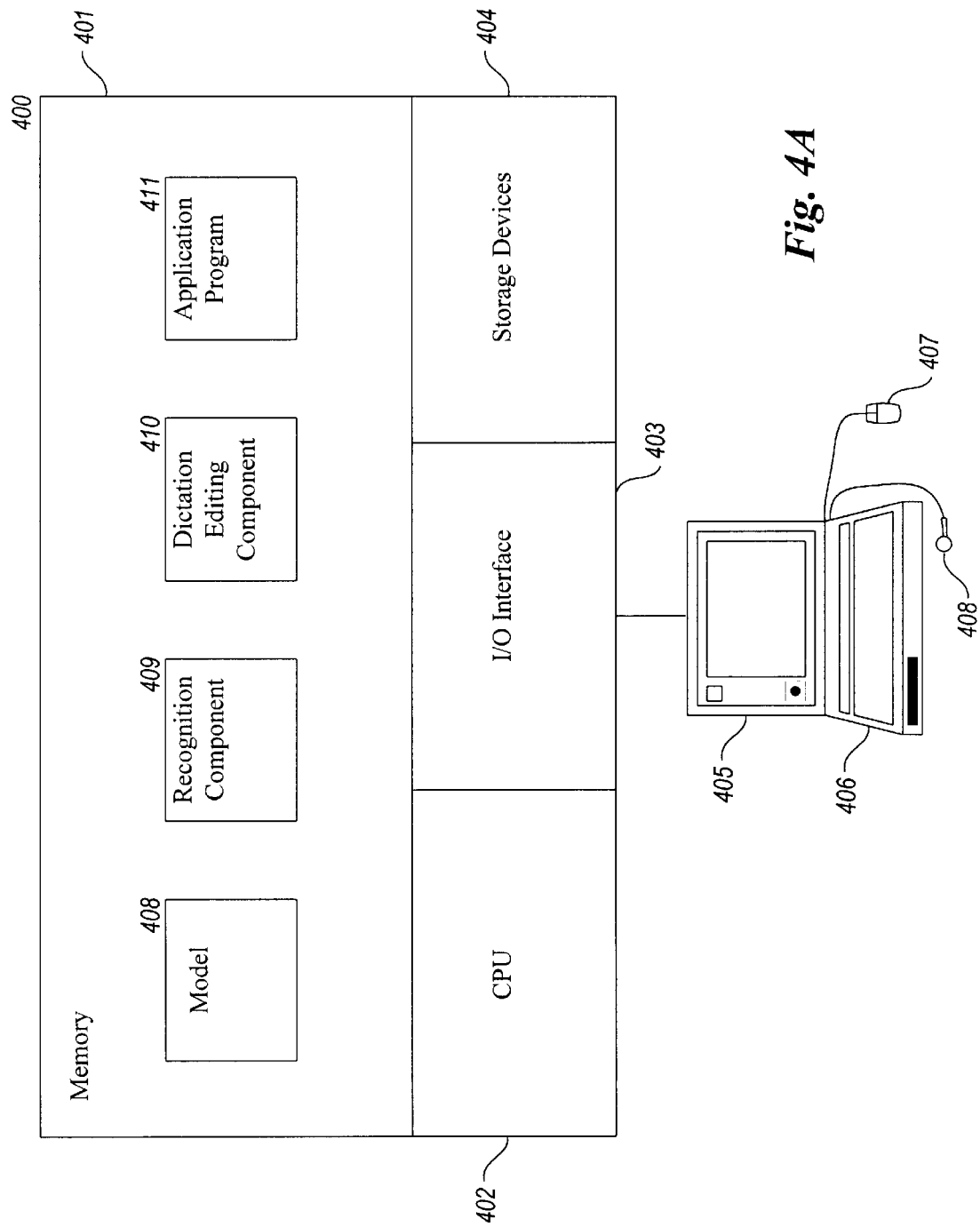
FIGS. 4A–C are block diagrams of a computer system of a preferred embodiment.
Figure 4B:
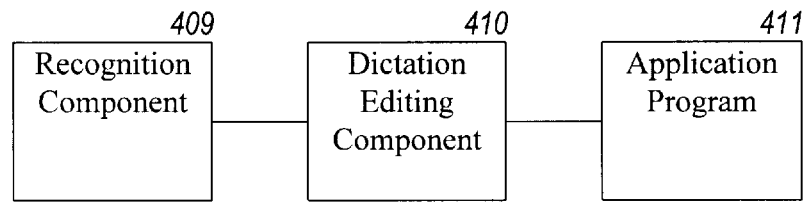
Figure 4C:
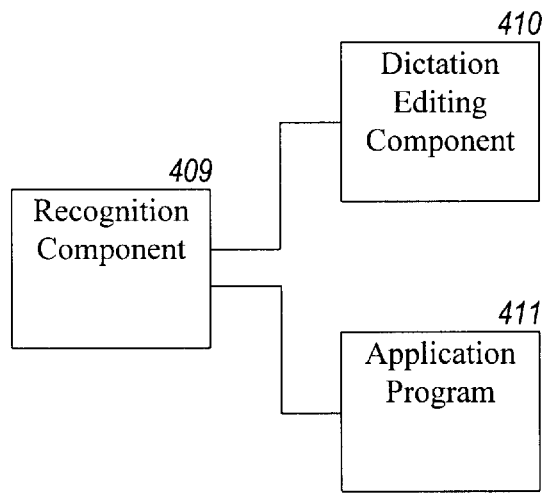

FIG. 4A is a block diagram of a computer system of a preferred embodiment. The computer system 400 contains a memory 401, a central processing unit 402, an I/O interface unit 403, storage devices 404, a display device 405, a keyboard 406, a mouse 407, and a microphone 408. The memory contains a CSR system comprising a model component 408, a recognition component 409, and a dictation editing component 410 and contains an application program 411. The model component contains the various model utterances for the words in the vocabulary. The recognition component receives spoken utterances and accesses the model component to generate the recognized word list. The dictation editing component receives the recognized word list and displays the recognized words. The recognition component, dictation editing component, and application program can be interconnected in various ways. FIGS. 4B–4C are block diagrams illustrating various interconnections of the recognition component, dictation editing component, and application program. In FIG. 4B, the recognition component interfaces with an application programming interface (API) of the dictation editing component, which in turn interfaces with an API of the application program. In FIG. 4C, the recognition component interfaces with the APIs provided by the dictation editing component and the application program. Alternatively, the application program could interface with APIs provided by the recognition component and the dictation editing component.

Figure 5A:
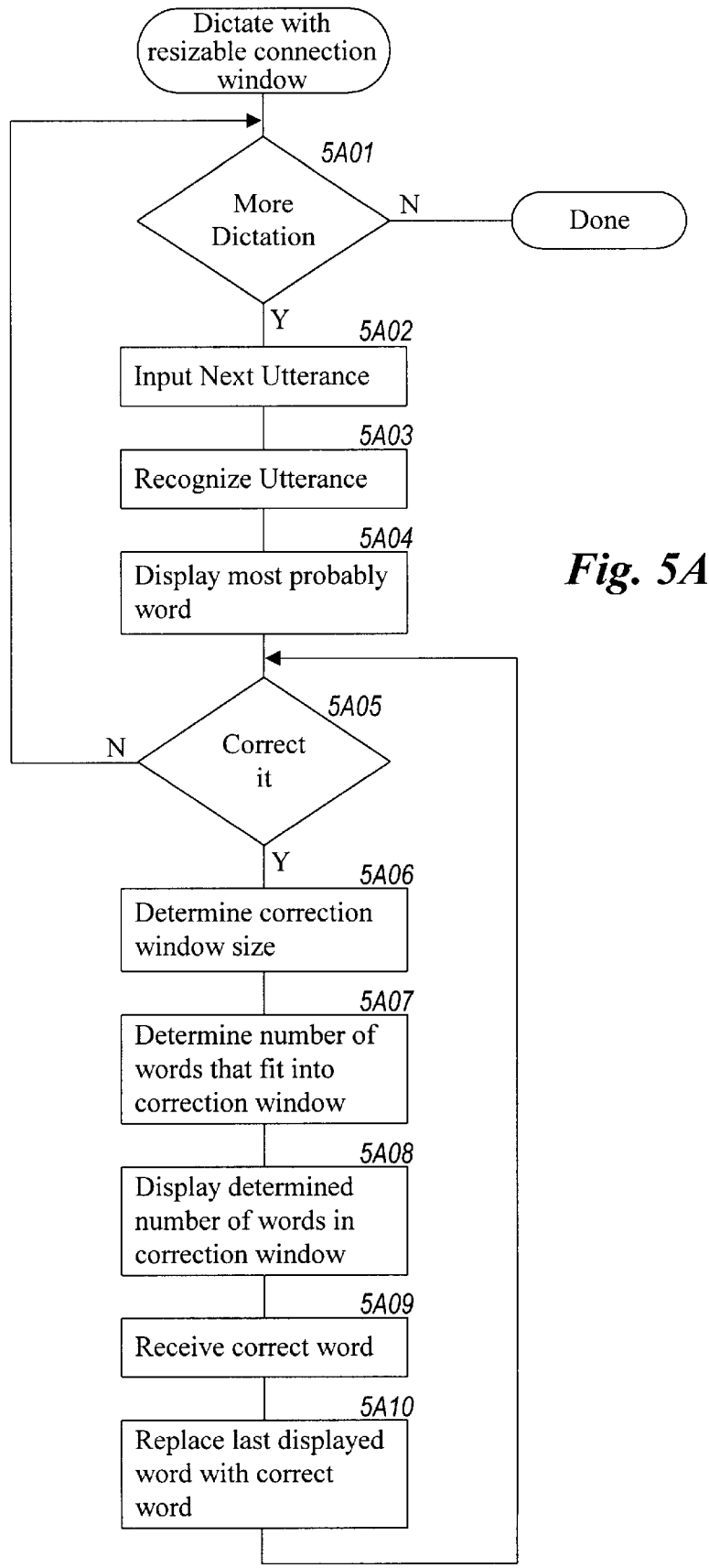
FIG. 5A is a flow diagram of a dictation editing component with a resizable correction window.

FIG. 5A is a flow diagram of a CSR system with a resizable correction window. By resizing the correction window, a speaker can indicate the number of words from the recognized word list that should be displayed. In steps 5A01–5A10, the CSR system loops receiving utterances that correspond to words, displaying recognized words, and allowing a speaker to correct the words. In step 5A01, if the speaker is to continue with dictation, then the system continues at step 5A02, else the dictation is complete. In step 5A02, the system inputs the next utterance from the speaker. In step 5A03, the system invokes the recognition component to recognize the spoken utterance. The recognition component returns the recognized word list with a probability that each word in the list corresponds to the spoken utterance. In step 5A04, the system selects and displays the word with the highest probability from the recognized word list. In steps 5A05–5A10, the system loops allow the speaker to correct displayed words. In step 5A05, if the speaker indicates to correct the displayed word, then the system continues at step 5A06, else the system loops to step 5A01 to continue with the dictation. In step 5A06, the system determines the current size of the correction window. In step 5A07, the system determines the number of words that can fit into the correction window based on its current size. In step 5A08, the system selects that number of words with the highest probability from the recognized word list and displays those words in the correction window. In one embodiment, the system sorts those selected words alphabetically before displaying them. In step 5A09, the system receives the correct word from the speaker. In step 5A10, the system replaces the displayed word with the correct word and loops to step 5A05.

Figure 5B:
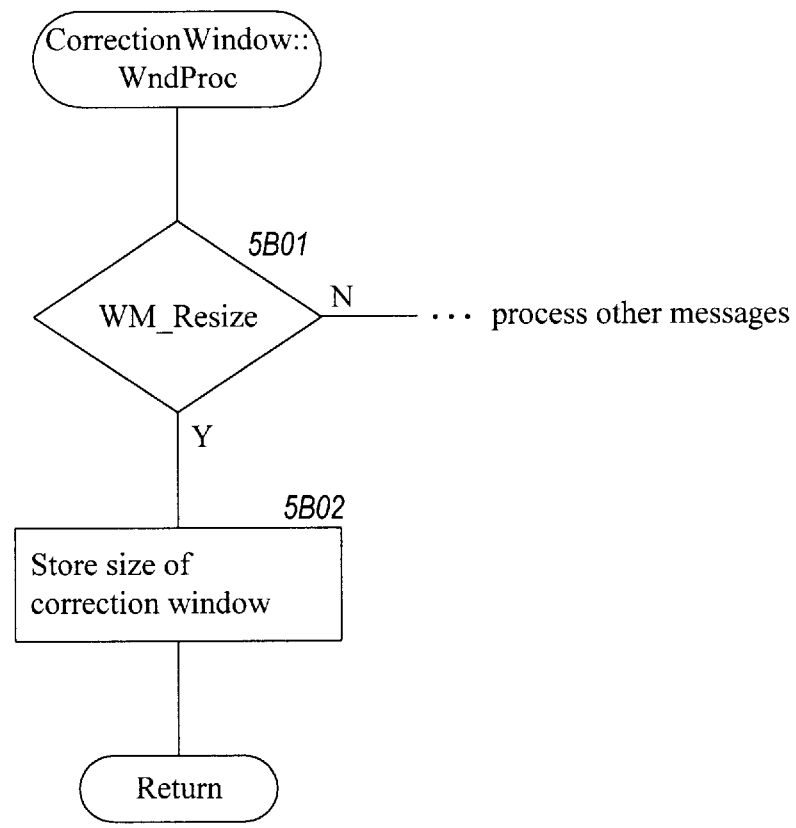
FIG. 5B is a flow diagram of a window procedure for the resizable correction window.

FIG. 5B is a flow diagram of a window procedure for the correction window. The window procedure receives and controls the processing of all events (i.e., messages) that are directed to the correction window. In step 5B01, if a message is received indicating that the window is being resized, then the procedure continues at step 5B02, else the procedure continues with normal processing of other messages. In step 5B02, the procedure stores the new size of the correction window. In addition, the procedure may indicate that the CSR system should recalculate the number of words that fit into the correction window and redisplay the correction window with that number of words.

Figure 6:
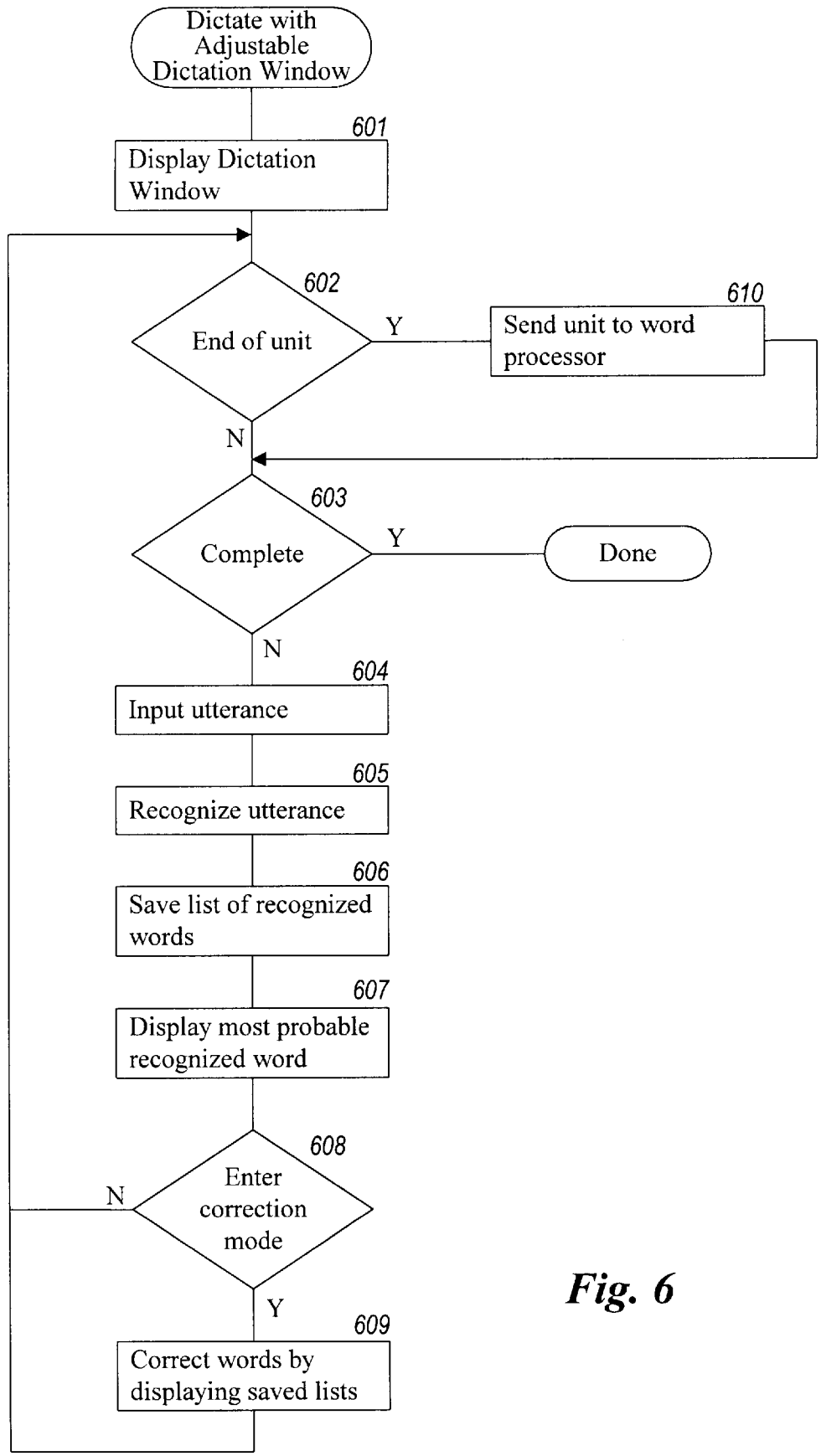
FIG. 6 is a flow diagram of a dictation editing component with an adjustable dictation window.

FIG. 6 is a flow diagram of an adjustable dictation window processing of a CSR system. The adjustable dictation window allows the speaker to specify the amount of speech that the dictation window can accommodate. The speaker can then use the correction facilities of the dictation editing component to correct that amount of speech that was last spoken. In step 601, the system displays the dictation window. In steps 602–609, the system loops processing each unit of speech (e.g., sentence or paragraph) and when a unit has been spoken, it sends that unit to the application program. The unit of speech may also be a line of words when the dictation window has been resized. In step 602, if the end of a speech unit has been received, then the system continues at step 610, else the system continues at step 603. In step 610, the system sends the unit of speech to the application program and continues at step 603. In step 603, the speaker indicates that dictation is complete, then the system is done, else the system continues at step 604. In step 604, the system inputs a spoken utterance from the speaker. In step 605, the system invokes the recognition component to recognize the spoken utterance and to return the recognized word list. In step 606, the system saves the recognized word list for later correction. In step 607, the system selects and displays the word with the highest probability in the recognized word list. In step 608, if the speaker indicates to enter the correction mode, then the system continues at step 609, else the system loops to step 602 to determine if the end of the speech unit has been reached. In step 609, the system allows the speaker to correct any of the words within the dictation window. The system, when requested by the speaker, displays a correction window with words from the saved recognized word lists. The system then loops to step 602 to input the next utterance.

Figure 7:
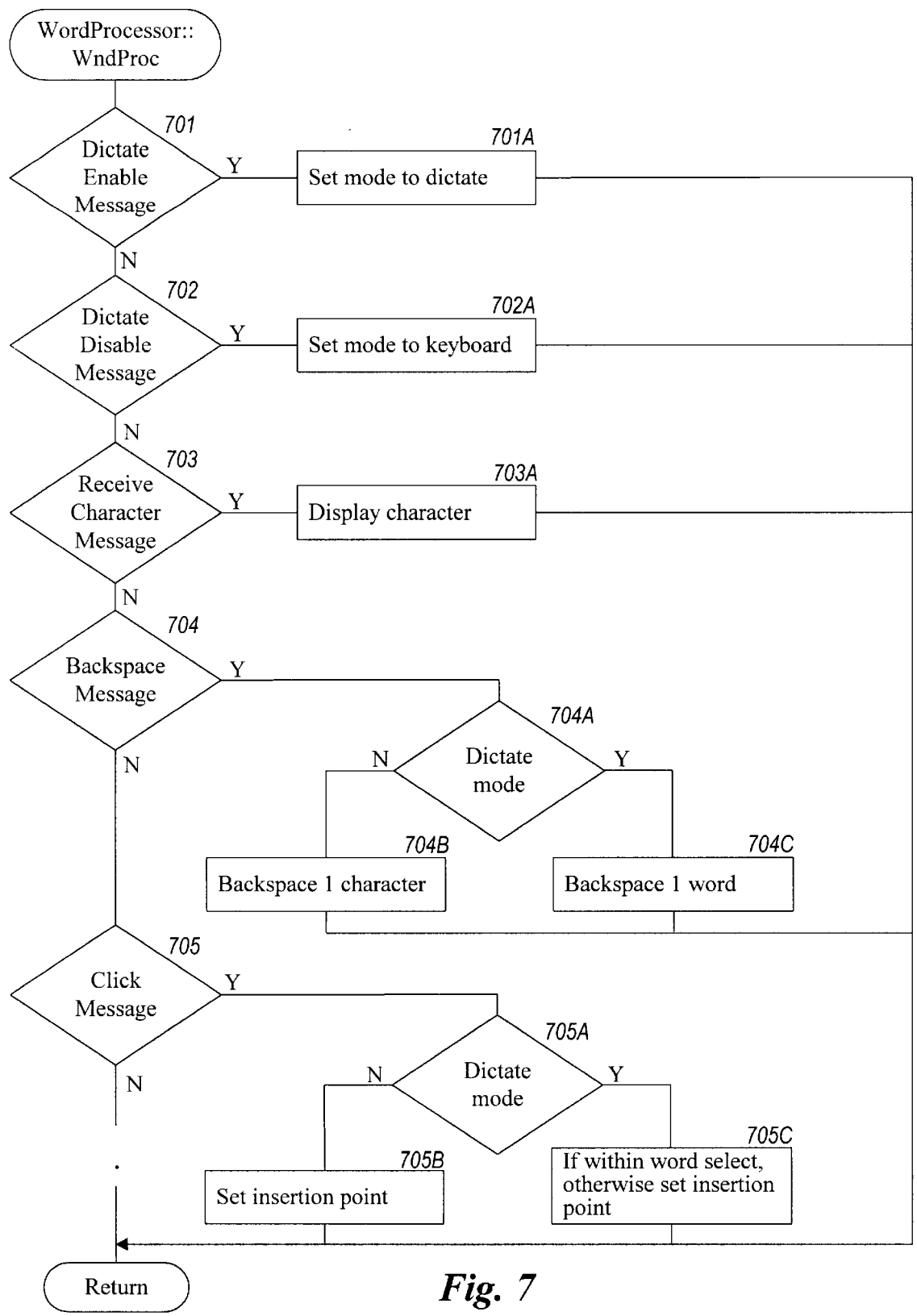
FIG. 7 is a flow diagram of a window procedure for a word processor or dictation editing component that implements the word correction metaphor.

FIG. 7 is a flow diagram of a window procedure for an application program or dictation editing component that implements the word correction metaphor. When in dictation mode, the component changes the editing behavior to be word-oriented, rather than character-oriented. In steps 701–705, the procedure determines which message has been received. In step 701, if a dictate enable message has been received, then the procedure continues at step 701A, else the procedure continues at step 702. In step 701A, the procedure sets the mode to a dictation mode and returns. In step 702, if the message is a dictate disable message, then the procedure continues at step 702A, else the procedure continues at step 703. In step 702A, the procedure sets the mode to indicate that data entry is through the keyboard rather than through dictation, and returns. In step 703, if the message is a receive character message, then the procedure continues at step 703A, else the procedure continues at step 704. In step 703A, the procedure displays the received character. The character may have been received either through a keyboard entry or as one of the characters of a recognized word. In step 704, if the message is a backspace message, then the procedure continues at step 704A, else the procedure continues at step 705. In step 704A, if the current mode is dictation, then the procedure continues at step 704C, else the procedure continues at step 704B. In step 704C, the procedure backspaces one word from the current insertion point. The backspacing of one word deletes the word to the left of the insertion point and returns. In step 704B, the procedure performs the normal backspace of one character and returns. In step 705, if the message is a mouse click message, then the procedure continues at step 705A, else the procedure continues with normal processing. In step 705A, if the current mode is dictation, then the procedure continues at step 705C, else the procedure continues at step 705B. If step 705C, if the click is within a word, then the procedure selects the entire word. Otherwise, the procedure sets the insertion point in between the words and returns. In step 705B, the procedure sets the insertion point as normal and returns.

Figure 8:
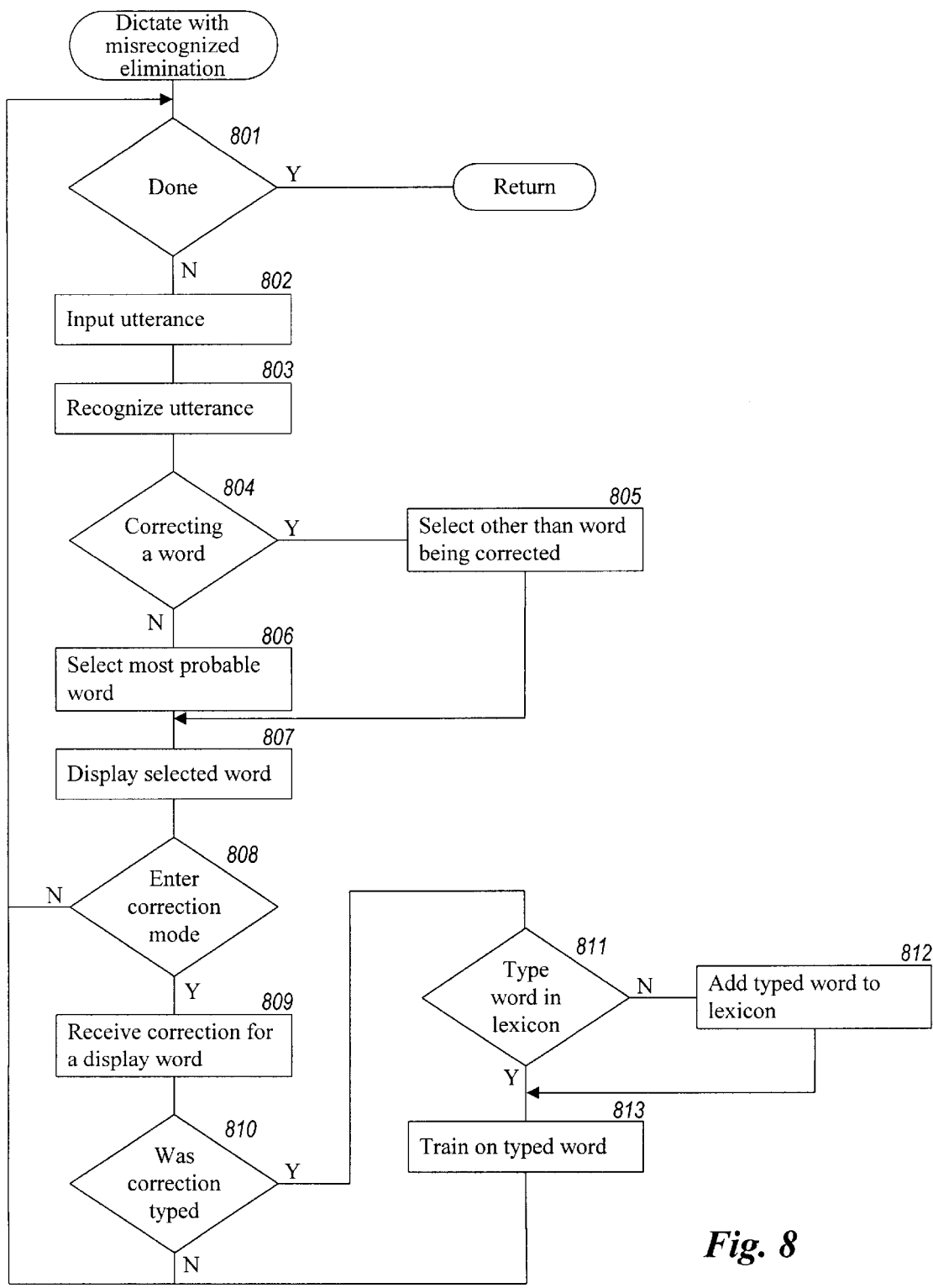
FIG. 8 is a flow diagram of a CSR system that eliminates misrecognized words from further recognition.

FIG. 8 is a flow diagram of a dictation editing component that eliminates misrecognized words from further recognition. The component detects when a speaker is speaking to correct a misrecognized word and prevents that misrecognized word from being re-recognized as the respoken utterance. In step 801, if the dictation is complete, then the component is done, else the component continues at step 803. In step 803, the component receives a recognized word list from the dictation component. In step 804, if the spoken utterance is an attempt by the speaker to correct a misrecognized word, then the component continues at step 805, else the component continues at step 806. In step 805, the component selects a word other than the word being corrected from the recognized word list and continues at step 807. In step 806, the component selects the most probable word from the recognized word list. In step 807, the component displays the selected word. In step 808, if the speaker indicates to enter a correction mode, then the component continues at step 809, else the component loops to step 801 to input another utterance. In step 809, the component receives the correction for a displayed word. In step 810, if the correction was entered through the keyboard, then the component continues at step 811, else the component loops to step 801 to select the next input utterance. In step 811, if the typed word is already in the vocabulary, then the component continues at step 813, else the component continues at step 812. In step 812, the component adds the typed word to the vocabulary. In step 813, the component trains the recognition system on the typed in word and loops to step 801 to input the next utterance.

Figure 9:
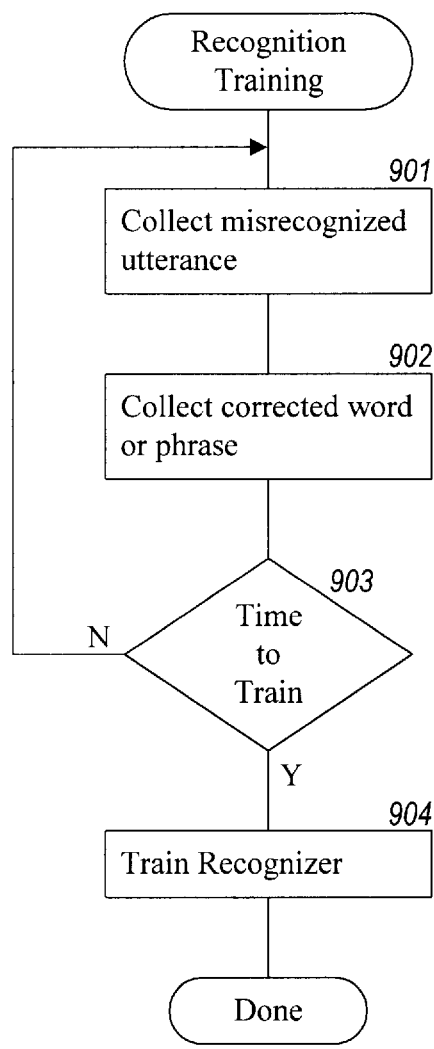
FIG. 9 is a flow diagram of automatic recognition training.

FIG. 9 is a flow diagram of a dictation editing component that automatically trains the recognition process. The dictation editing component collects utterances that were misrecognized along with the corrected word or phrase. The dictation editing component then directs the recognition component to train the recognition process to recognize the misrecognized utterances as the corrected word or phrase. This training can be performed as each misrecognized utterance is corrected or the information saved and training performed at a later time. In steps 901–903, the component collects misrecognized utterances and the correct word or phrase. This information can be collected when the component detects that a speaker has corrected a word or phrase. In step 903, the component determines whether the recognizer should be trained. Such training can be performed at times when the computer system would otherwise be idle or when the accuracy of recognition is unacceptable. In step 904, the component trains the recognizer on the collected utterances.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a continuous-speech recognition computer system for correcting speech that is misrecognized; the speech being recognized as a plurality of words, the method comprising:

receiving from a speaker a selection of a misrecognized phrase comprising less than all of the plurality of words, the misrecognized phrase having two or more words;

after receiving the selection of the misrecognized phrase, identifying one or more alternative phrases that may correspond to the misrecognized phrase;

displaying the identified alternative phrases;

receiving from the speaker a selection of a displayed phrase; and replacing the misrecognized phrase with the selected phrase.

2. A method in a continuous-speech recognition computer system for correcting a spoken utterance that is misrecognized as a phrase having a plurality of words, the method comprising:

receiving from a speaker an indication to correct the misrecognized phrase;

identifying one or more alternative phrases that may correspond to the spoken utterance, wherein the identifying of alternative phrases does not identify any alternative phrase that differs from the misrecognized phrase by only one word;

displaying the identified alternative phrases;

receiving from the speaker a selection of a displayed phrase; and replacing the misrecognized phrase with the selected phrase.

3. A method in a continuous-speech recognition computer system for correcting a spoken utterance that is misrecognized as a phrase having a plurality of words, the method comprising:

receiving from a speaker an indication to correct the misrecognized phrase;

identifying one or more alternative phrases that may correspond to the spoken utterance, wherein the identifying of alternative phrases does not identify any alternative phrase that can be corrected by selecting alternative words for each word of the misrecognized phrase;

displaying the identified alternative phrases;

receiving from the speaker a selection of a displayed phrase; and replacing the misrecognized phrase with the selected phrase.

4. A computer-readable medium having instructions for causing a continuous-speech recognition computer system to correct speech that is misrecognized, the speech being recognized as a plurality of words, by:

displaying the plurality of words;

receiving from a speaker a selection of a misrecognized phrase comprising less than all of the plurality of words, the misrecognized phrase having two or more words;

after receiving the selection of the misrecognized phrase, identifying a plurality of alternative phrases that may correspond to the misrecognized phrase;

displaying the identified alternative phrases;

receiving from the speaker a selection of a displayed phrase; and displaying the selected phrase in place of the misrecognized phrase.

5. A computer-readable medium having instructions for causing a continuous-speech recognition computer system to correct a spoken utterance that is misrecognized as a phrase having a plurality of words, by:

displaying the misrecognized phrase;

receiving from a speaker an indication to correct the misrecognized phrase;

identifying a plurality of alternative phrases that may correspond to the spoken utterance, wherein the identifying of alternative phrases does not identify any alternative phrase that differs from the misrecognized phrase by only one words;

displaying the identified alternative phrases;

receiving from the speaker a selection of a displayed phrase; and displaying the selected phrase in place of the misrecognized phrase.

6. A computer-readable medium having instructions for causing a continuous-speech recognition computer system to correct a spoken utterance that is misrecognized as a phrase having a plurality of words, by:

displaying the misrecognized phrase;

receiving from a speaker an indication to correct the misrecognized phrase;

identifying a plurality of alternative phrases that may correspond to the spoken utterance, wherein the identifying of alternative phrases does not identify any alternative phrase that can be corrected by selecting alternative words for words in the misrecognized phrase;

displaying the identified alternative phrases;

receiving from the speaker a selection of a displayed phrase; and displaying the selected phrase in place of the misrecognized phrase.

7. The computer-readable medium of claim 4 wherein the identifying of alternative phrases includes inputting and recognizing a newly spoken utterance for the misrecognized phrase.

8. A computer-readable medium having instructions for causing a continuous-speech recognition computer system to correct a spoken utterance that is misrecognized as a phrase having a plurality of words, by:

displaying the misrecognized phrase;

receiving from a speaker an indication to correct the misrecognized phrase;

identifying a plurality of alternative phrases that may correspond to the spoken utterance, wherein the identifying of alternative phrases does not include phrases with words whose correspondence between portions of the spoken utterance is approximately the same as the correspondence between words of the misrecognized phrase;

displaying the identified alternative phrases;

receiving from the speaker a selection of a displayed phrase; and displaying the selected phrase in place of the misrecognized phrase.

9. A continuous-speech recognition computer system for correcting speech that is misrecognized, the speech being recognized as a plurality of words, comprising:

a display device;

a recognition component that receives speech and provides phrases with words representing the speech; and a dictation editing component that displays words that represents a misrecognition of speech, that receives a selection of less than all of the displayed words representing a misrecognized phrase with two or more words, that after receiving the selection, displays on the display device a plurality of alternative phrases that may correspond to the misrecognized phrase, that receives a selection of a displayed phrase, and that displays the selected phrase in place of the misrecognized phrase on the display device.

10. A continuous-speech recognition computer system for correcting speech that is misrecognized, the speech being recognized as a plurality of words, comprising:

a display device;

a recognition component that receives speech and provides phrases with words representing the speech; and a dictation editing component that displays words that represents a misrecognition of speech, that receives a selection of less than all of the displayed words representing a misrecognized phrase, that after receiving the selection, displays on the display device a plurality of alternative phrases that may correspond to the misrecognized phrase, that receives a selection of a displayed phrase, and that displays the selected phrase in place of the misrecognized phrase on the display device wherein the plurality of alternative phrases does not include any alternative phrase that can be corrected by selecting alternative words for words in the misrecognized phrase.

\* \* \* \* \*